Aug. 24, 1965 H. M. GEYER 3,202,008
SCREW AND NUT ACTUATOR
Filed May 27, 1963 2 Sheets-Sheet 2
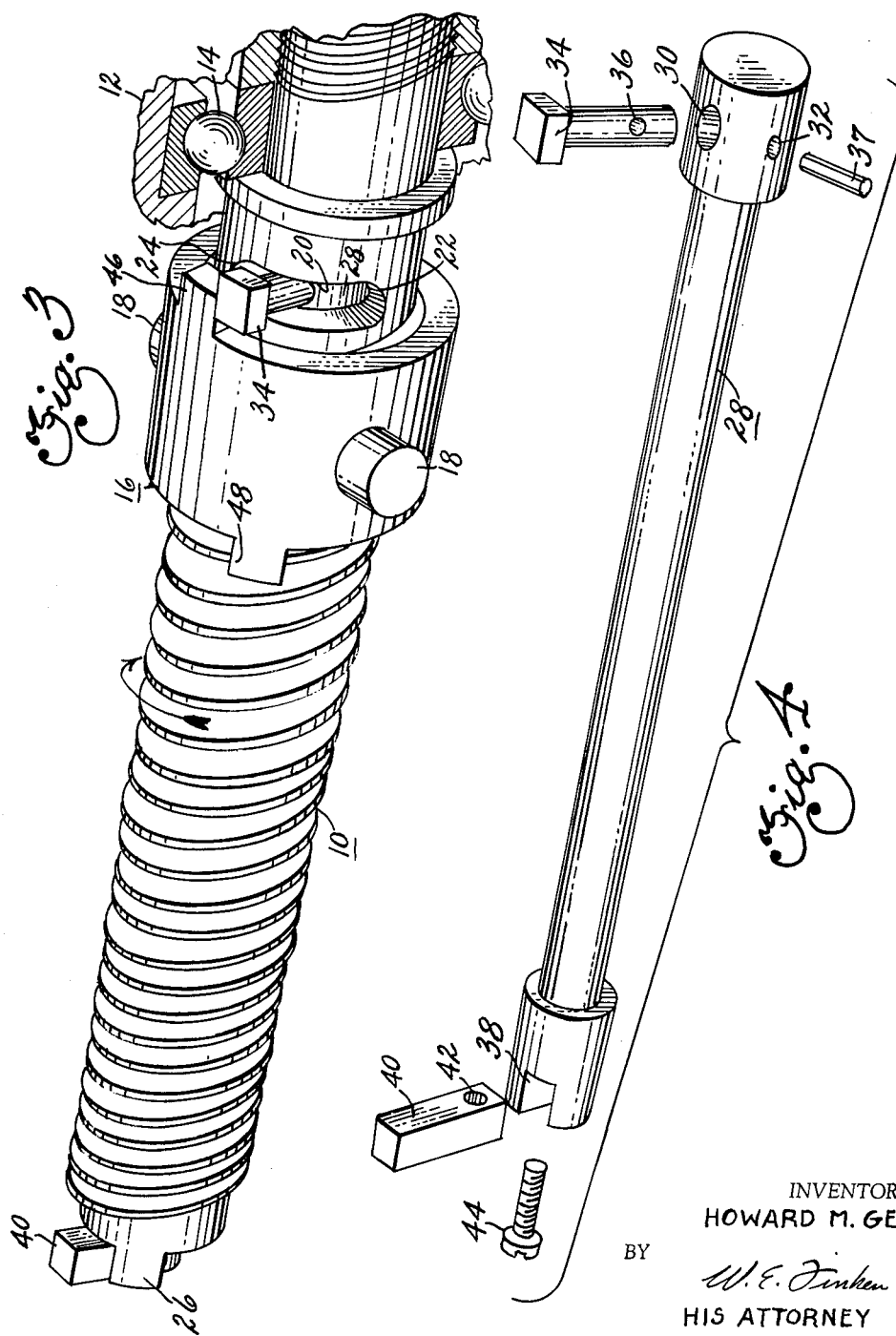
INVENTOR.
HOWARD M. GEYER
BY
W. E. Finken
HIS ATTORNEY

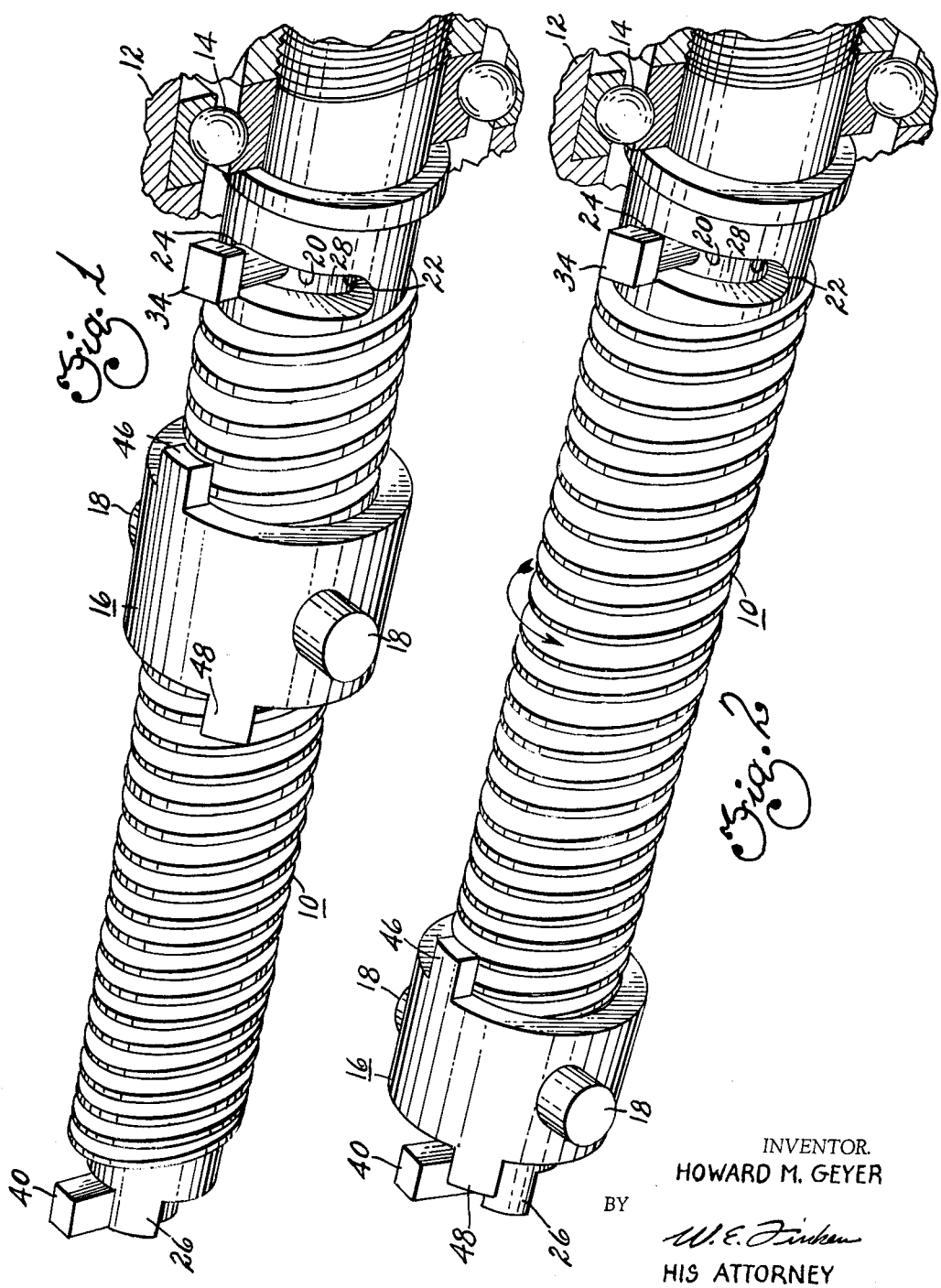

United States Patent Office 3,202,008
Patented Aug. 24, 1965

3,202,008
SCREW AND NUT ACTUATOR
Howard M. Geyer, Dayton, Ohio, assignor to General Motors Corporation, Detroit, Mich., a corporation of Delaware
Filed May 27, 1963, Ser. No. 283,262
4 Claims. (Cl. 74—424.8)

This invention pertains to linear actuators and particularly to an improved linear screw and nut actuator.

Heretofore, screw and nut actuators have been made embodying a torsion bar for providing a cushioned stop at the stroke end positions of actuator movement. A screw and nut actuator of this construction is shown in Werner Patent 2,482,568. However, in previous actuators of this type the torsion bar constituted the driving connection between the motor and the screw shaft. In the present invention, the rotatable driving means is directly connected to the screw shaft and the torsion bar is mounted coaxially thereof so as to be normally rotated therewith although capable of angular deflection, or twisting movement, relative to the screw shaft adjacent the stroke ends of actuator movement.

Accordingly, among my objects are the provision of an improved screw and nut actuator having cushioned stop means at the stroke ends of actuator movement; the further provision of a screw and nut actuator of the aforesaid type embodying a torsion bar having a pair of one-way driving connections with the screw; and the still further provision of a trunnion mounted screw and nut actuator embodying a torsion bar and wherein the torsion bar is normally connected for rotation with the screw shaft in opposite directions although capable of angular deflection relative thereto at the stroke ends.

The aforementioned and other objects are accomplished in the present invention by coaxially arranging the torsion bar within a hollow screw shaft and providing coacting abutments on the screw shaft and torsion bar for normally rotating the torsion bar with the screw shaft. The actuator nut includes abutments engageable with the abutments on the torsion bar adjacent the stroke ends of actuator movement for twisting the torsion bar so as to bring the actuator to a cushioned stop at its stroke end positions.

Further objects and advantages of the present invention will be apparent from the following description, reference being had to the accompanying drawings, wherein a preferred embodiment of the present invention is clearly shown.

In the drawings:

FIGURE 1 is a fragmentary perspective view, partly in section and partly in elevation, depicting a screw and nut actuator constructed according to the present invention.

FIGURE 2 is a view similar to FIGURE 1 depicting the actuator at its extended stroke end positions.

FIGURE 3 is a view similar to FIGURE 2 depicting the actuator in its retracted stroke end position.

FIGURE 4 is an exploded perspective view of the torsion bar.

With particular reference to FIGURE 1, the improved screw and nut actuator of the present invention includes a hollow rotatable screw shaft 10 rotatably supported in a housing 12 by a combined radial and thrust ball bearing assembly 14, with the screw shaft 10 extending axially therefrom. The inner end of the screw shaft 10 is suitably drivingly connected to reversible rotary drive means, not shown, which may take the form of a reversible electric motor and gear reduction unit. A nut 16 threadedly engages the screw shaft, the nut having a pair of diametrically opposed trunnions 18 for attaching it to a load device, not shown, which restrains rotation thereof. Accordingly, upon rotation of the screw shaft 10 the nut 16 and the load device connected therewith will move in a linear fashion.

As seen in FIGURE 1, the screw shaft 10 is formed with an elongate arcuate slot 20 adjacent its inner end and an axially projecting lug 26 adjacent its outer end. The arcuate slot 20 has end surfaces 22 and 24 constituting abutments as will be pointed out more particularly hereinafter.

Referring to FIGURE 4, a torsion bar 28 is arranged coaxially of the hollow screw shaft 10. The torsion bar 28 has a pair of diametrically extending circular holes 30 and 32, located at right angles to each other, adjacent its inner end. The hole 30 receives a dog stop, or abutment, 34 which projects through the arcuate slot 20 of the screw shaft, the dog stop 34 having a transverse circular hole 36 for receiving the pin 37. The outer end of the torsion bar is formed with an axially extending slot 38 for receiving a second dog stop, or abutment, 40, the abutment 40 having a circular hole 42 for receiving a fastener 44 which has threaded engagement with the torsion bar 28.

When the torsion bar 28 is assembled with the hollow screw shaft 10, the abutment 40 engages the lug, or abutment 26, on the screw shaft, and the abutment 34 extends through the arcuate slot 20 of the screw shaft. During counterclockwise rotation of the screw shaft 10, as seen in FIGURE 1, the nut 16, and hence the load device connected therewith, moves axially outward, and the torsion bar 28 is rotated with the screw shaft by engagement between the abutment 24 and the abutment 34. Conversely, during clockwise rotation of the screw shaft 10 as seen in FIGURE 1, the nut 16 moves axially inward and the torsion bar 28 is rotated with the screw shaft through engagement of abutments 26 and 40.

The nut 16 has a pair of axially extending dog teeth, or abutments, 46 and 48, the abutment 46 being engageable with the abutment 34 of the torsion bar, and the abutment 48 being engageable with the abutment 40 of the torsion bar. As the nut 16 approaches its extend stroke end limit, as seen in FIGURE 2, the abutment 48 engages the abutment 40, and during continued counterclockwise rotation the screw shaft 10 will twist the inner end of the torsion bar 28 relative to the screw shaft 10 in the counterclockwise direction to provide a cushioned stop. At this time the outer end of the torsion bar 28 is restrained against rotation with the screw shaft by engagement of the abutments 40 and 48.

Conversely, as the nut 16 approaches its retract stroke end position, the abutment 46 on the nut will engage the abutment 34 of the torsion bar so that continued clockwise rotation of the screw shaft will twist the outer end of the torsion bar in the clockwise direction since the inner end of the torsion bar is restrained against rotation with the screw shaft by engagement of abutments 34 and 46, thus providing a cushioned stop for the retract stroke end position. The arcuate slot 20 in the screw shaft must be of sufficient angular extent to take up the torsional deflection at the retract stroke end position.

While the embodiment of the invention as herein disclosed constitutes a preferred form, it is to be understood that other forms might be adopted.

What is claimed is as follows:

1. A screw and nut actuator comprising a reversely rotatable hollow screw shaft, a nonrotatable nut threadedly engaging said screw shaft whereby rotation of said screw shaft will effect linear movement of said nut, a torsion bar mounted coaxially of said hollow screw shaft, coacting engageable abutments adjacent each end of said hollow screw shaft and said torsion bar for rotating said torsion bar with said screw shaft in opposite directions, and abutment means on said nut engageable with each of said abutments on said torsion bar adjacent opposite stroke end positions of said nut for restraining rotation of opposite ends of said torsion bar in opposite directions during continued rotation of said screw shaft so as to twist said torsion bar and provide cushioned stops at the stroke end positions of said nut.

2. A screw and nut actuator comprising a reversely rotatable hollow screw shaft, a nonrotatable nut threadedly engaging said screw shaft assembly whereby rotation of said screw shaft will effect linear movement of said nut, a torsion bar disposed coaxially within said hollow screw shaft, coacting engageable abutments adjacent each end of the screw shaft and the torsion bar for rotating said torsion bar with said screw shaft in opposite directions, and a pair of oppositely extending abutments on said nut engageable respectively with the abutments on opposite ends of said torsion bar for restraining rotation of opposite ends of said torsion bar in opposite directions during continued rotation of said screw shaft so as to twist said torsion bar and provide a cushioned stop at the stroke end limits of said nut.

3. A screw and nut actuator comprising a reversely rotatable hollow screw shaft having an arcuate slot adjacent its inner end and an axially projecting lug adjacent its outer end, a nonrotatable nut threadedly engaging said screw shaft whereby rotation of said screw shaft will impart linear movement to said nut, a torsion bar coaxially disposed within said screw shaft having an abutment adjacent its outer end engageable with the lug on said screw for rotating said torsion bar with said screw shaft in one direction, said torsion bar having an abutment projecting through the slot in said screw shaft and engageable with one end thereof for rotating said torsion bar with said screw shaft in the opposite direction, and an abutment projecting from each end of said nut engageable with one of the abutments on said torsion bar adjacent each stroke end position thereof to restrain rotation of one or the other end of said torsion bar with said screw shaft so as to provide a cushioned stop adjacent said stroke end position.

4. In a screw and nut actuator having a reversely rotatable hollow screw shaft and a nonrotatable nut threadedly engaging said screw shaft whereby rotation of said screw shaft will impart linear movement to said nut, a torsion bar coaxially disposed within said hollow screw shaft, one-way driving connections between opposite ends of said torsion bar and opposite ends of said screw shaft for rotating said torsion bar with said screw shaft in both directions, and abutment means on said nut engageable with said torsion bar adjacent the stroke end positions thereof for restraining opposite ends of said torsion bar from rotation with said screw shaft so as to twist opposite ends of said torsion bar in opposite directions adjacent said stroke ends to provide cushioned stops.

References Cited by the Examiner
UNITED STATES PATENTS 2,907,223   10/59   Valenti _____ 74—424.8

DON A. WAITE, *Primary Examiner.*